W. R. UHLEMANN.
LENS MOUNTING.
APPLICATION FILED FEB. 5, 1917.

1,290,419.

Patented Jan. 7, 1919.

Witness:
Wm. M. Haenel

Inventor,
William R. Uhlemann
By Robert Burns
Attorney.

UNITED STATES PATENT OFFICE.

WILLIAM R. UHLEMANN, OF CHICAGO, ILLINOIS.

LENS-MOUNTING.

1,290,419.  Specification of Letters Patent.  Patented Jan. 7, 1919.

Application filed February 5, 1917. Serial No. 146,667.

*To all whom it may concern:*

Be it known that I, WILLIAM R. UHLEMANN, a citizen of the United States of America, and a resident of Chicago, in the county of Cook, State of Illinois, have invented certain new and useful Improvements in Lens-Mountings, of which the following is a specification.

This invention relates to mountings for frameless eyeglasses and spectacles, and more especially to the particular type of such mountings which constitute the subject matter of my prior Patent No. 933,502, dated September 7, 1909.

And the present improvement has for its object to provide a compact and efficient structural formation and combination of the mounting parts, whereby the lens members associated therewith are yieldingly pivoted in place and in a manner to permit a proper degree of independent pivotal movement against a yielding stress, and with which an undue degree of such movement is prevented, with a view to prevent a permanent set in the resilient means, or damage to the lenses or other part by an excess pivotal movement of the lenses. Another object is to provide means for detachably securing the resilient element or member of the structure in place in a simple and secure manner. All as will hereinafter more fully appear.

In the accompanying drawings:—

Similar reference numerals indicate like parts in the several views.

Figure 1:
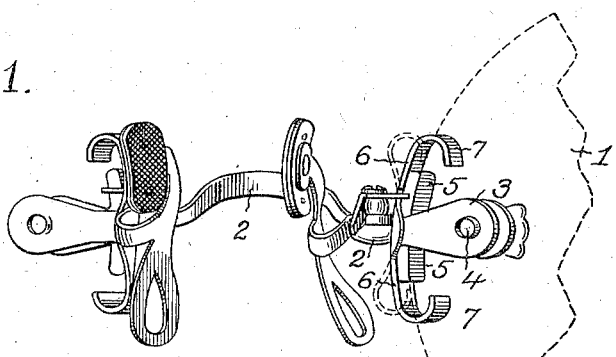
Figure 1, is a perspective view of an eyeglass mounting having the present invention applied.
Figure 3:
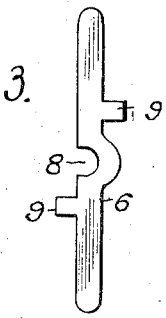
Fig. 3, is an elevation of the blank for forming the resilient member of the present invention.

In the drawings, 1 designates one of the lenses of a frameless eyeglass, and 2 the usual rigid bridge or arch by which a pair of said lenses are connected together in proper separated relation by attaching straps or clips 3 and transverse screws 4 passing through orifices in said straps and in the margins of the lenses, as usual in rimless eyeglass mountings.

5 designates the usual braces fixedly associated with the straps 3 aforesaid, and disposed in adjacent relation to the edge of the lens 1 with which said parts are associated. In the present structure the braces 5 are made shorter than usual, in that their main function in the present structure is to provide the preferred means for holding in place the resilient bearing or abutment means hereinafter described in detail.

Figure 2:
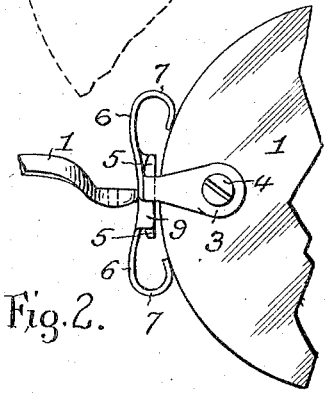
Fig. 2, is a detail elevation of the same.
Figure 6:
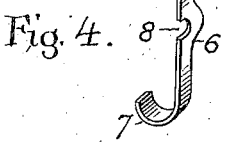
Fig. 6, is a detail perspective view of a modified form of the resilient member and its attaching means.
Figure 4:
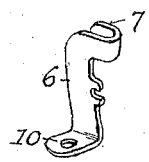
Fig. 4, is a detail perspective view of a simple form of the resilient member aforesaid.
Figure 5:
Fig. 5, is an elevation of a blank for forming the same.

The material part of the present improvement comprises a resilient abutment or bearing member for the edge of the lens adjacent to the aforesaid attaching straps 3, and consisting of a structural formation as follows:

6 designates a strip of resilient metal or like material fixedly attached near its middle and having free upper and lower portions curved toward the edge of the lens 1 so as to have bearing against same. In the preferred construction shown in Figs. 1, 2 and 4, the free ends of said upper and lower portions of the resilient strip 6 are bent into open loops or bends 7, which are adapted to bear against the edge of the lens and owing to their C formation, possess increased resiliency at said bearing points. And while said bends 7 are preferably of the C shape and alined with the main portion of the strip 6 as shown in Figs. 1, 2 and 4, it is within the scope of this portion of the invention to arrange said bends 7 in a direction transverse to the main portion of the strip 6, as shown in Fig. 6.

8 designates a centrally disposed open sided recess in the resilient strip 6 aforesaid, and adapted to be forced laterally over and engaged upon the bridge or arch 1, to maintain the said resilient strip 6 against accidental displacement in either a lateral direction or in a plane parallel with the surface of the lens.

9 designates clip projections or ears formed on the sides of the resilient strip 6 and adjacent to the central portion thereof. Said ears 9 are adapted to be bent against the sides of the braces 5 aforesaid, as shown in Fig. 2, to assist in holding the resilient strip 6 in proper operative position.

While the above described single piece formation of the resilient strip 6 is the preferred form of the present invention, it is within the scope thereof, to make the resilient strip 6 of separate upper and lower counterpart sections 6' and to form each of said sections with a laterally disposed eye portion 10 at its base. Said eye portion 10 is adapted to fit a pivot post of the finger piece mechanism of the bridge 1 and be secured in place by the same means which secures said finger piece mechanism in place.

Having thus fully described my said invention, what I claim as new and desire to secure by Letters Patent, is:—

1. A lens mounting having a pair of lens attaching straps and upper and lower braces midway of said straps, and a resilient abutment member secured to the mounting outside said braces and comprising a strip of resilient material having a curved form and secured at its mid-length to a fixed mid portion of the mounting adjacent to the back portion of the braces aforesaid, the free upper and lower ends of said strip being adapted to resiliently bear against the edge of a lens associated with the straps and braces aforesaid, substantially as set forth.

2. A lens mounting having a pair of lens attaching straps and upper and lower braces midway of said straps, and a resilient abutment member secured to the mounting outside said braces and comprising a strip of resilient material having a curved form and secured at its mid-length to the aforesaid bridge adjacent to the back portion of the aforesaid braces, the free upper and lower ends of said strip being adapted to resiliently bear against the edge of a lens associated with the straps and braces aforesaid, substantially as set forth.

3. A lens mounting comprising a bridge, a pair of attaching straps, upper and lower braces fixedly associated with said straps, and a resilient abutment member comprising a strip of resilient material having a curved form and secured at its mid-length to the aforesaid bridge by an open sided recess in said resilient strip, the free upper and lower ends of said strip being adapted to resiliently bear against the edge of a lens associated with the straps and braces aforesaid, substantially as set forth.

4. A lens mounting comprising a bridge, a pair of attaching straps, upper and lower braces fixedly associated with said straps, and a resilient abutment member comprising a strip of resilient material having a curved form and secured at its mid-length to the aforesaid bridge by an open sided recess in said resilient strip and by ears formed on said strip and having engagement with the braces aforesaid, the free upper and lower ends of said strip being adapted to resiliently bear against the edge of a lens associated with the straps and braces aforesaid, substantially as set forth.

5. A lens mounting having a pair of lens attaching straps and upper and lower braces midway of said straps, and a resilient abutment member secured to the mounting outside said braces and comprising a strip of resilient material having a curved form and secured at its mid-length to a fixed mid portion of the mounting adjacent to the back portion of the braces aforesaid, the free upper and lower ends of said strip having open bends adapted to resiliently bear against the edges of a lens associated with the straps and braces aforesaid, substantially as set forth.

6. A lens mounting having a pair of lens attaching straps and upper and lower braces midway of said straps, and a resilient abutment member secured to the mounting outside said braces and comprising a strip of resilient material having a curved form and secured at its mid-length to the aforesaid bridge adjacent to the back portion of the aforesaid braces, the free upper and lower ends of said strip having open bends adapted to resiliently bear against the edge of a lens associated with the straps and braces aforesaid, substantially as set forth.

7. A lens mounting comprising a bridge, a pair of attaching straps, upper and lower braces fixedly associated with said straps, and a resilient abutment member comprising a strip of resilient material having a curved form and secured at its mid-length to the aforesaid bridge by an open sided recess in said resilient strip, the free upper and lower ends of said strip having open bends adapted to resiliently bear against the edge of a lens associated with the straps and braces aforesaid, substantially as set forth.

8. A lens mounting comprising a bridge, a pair of attaching straps, upper and lower braces fixedly associated with said straps, and a resilient abutment member comprising a strip of resilient material having a curved form and secured at its mid-length to the aforesaid bridge by an open sided recess in said resilient strip and by ears formed on said strip and having engagement with the braces aforesaid, the free upper and lower ends of said strip having open bends adapted to resiliently bear against the edge of a lens associated with the straps and braces aforesaid, substantially as set forth.

Signed at Chicago, Illinois, this 31st day of January, 1917.

WILLIAM R. UHLEMANN.

Copies of this patent may be obtained for five cents each, by addressing the "Commissioner of Patents, Washington, D. C."